United States Patent
Ogino et al.

(10) Patent No.: US 7,739,885 B2
(45) Date of Patent: Jun. 22, 2010

(54) METHODS FOR THE PRODUCTION OF GLASS SUBSTRATE BLANK

(75) Inventors: Kazuo Ogino, Akishima (JP); Koji Suzuki, Tokyo (JP)

(73) Assignee: Hoya Corporation, Tokyo (JP)

( * ) Notice: Subject to any disclaimer, the term of this patent is extended or adjusted under 35 U.S.C. 154(b) by 82 days.

(21) Appl. No.: 10/277,101

(22) Filed: Oct. 22, 2002

(65) Prior Publication Data

US 2003/0074921 A1    Apr. 24, 2003

(30) Foreign Application Priority Data

Oct. 24, 2001    (JP)    ............................. 2001-325850

(51) Int. Cl.
C03C 3/076    (2006.01)
(52) U.S. Cl. .................. 65/99.2; 65/33.13; 65/33.14
(58) Field of Classification Search ............ 65/99.2, 65/374.12, 30.13, 30.14, 33.1, 33.9
See application file for complete search history.

(56) References Cited

U.S. PATENT DOCUMENTS

| | | | | |
|---|---|---|---|---|
| 3,584,475 A | * | 6/1971 | Galey et al. ................ | 65/24 |
| 4,191,528 A | * | 3/1980 | Boggum et al. ............. | 432/248 |
| 4,382,811 A | * | 5/1983 | Luscher et al. ............. | 65/374.11 |
| 4,812,372 A | * | 3/1989 | Kithany ...................... | 428/664 |
| 4,877,435 A | * | 10/1989 | Haeberle et al. ............ | 65/515 |
| 4,985,306 A | * | 1/1991 | Morizane et al. ........... | 216/53 |
| 6,086,977 A | * | 7/2000 | Suzuki et al. ............... | 428/141 |
| 6,250,111 B1 | * | 6/2001 | Murakami et al. .......... | 65/134.9 |
| 6,277,465 B1 | * | 8/2001 | Watanabe et al. ........... | 428/141 |
| 6,627,566 B1 | | 9/2003 | Zou | |
| 6,905,988 B2 | | 6/2005 | Zou | |
| 7,015,161 B2 | | 3/2006 | Zou | |

FOREIGN PATENT DOCUMENTS

| | | |
|---|---|---|
| JP | 62-59576 | 3/1987 |
| JP | 6-287059 | 10/1994 |
| JP | 11-130529 | 5/1999 |
| JP | 11-343143 | 12/1999 |
| JP | 2000302560 A | * 10/2000 |
| JP | 2001-76336 | 3/2001 |
| JP | 2001-180975 | 7/2001 |
| JP | 2001-27178 | 10/2001 |

OTHER PUBLICATIONS

Machine translation of JP 2000-302560 retrieved from http://www19.ipdl.ncipi.go.jp/PA1/cgi-bin/PA1INIT?1102431898753 on Jun. 19, 2006.*

* cited by examiner

Primary Examiner—Carlos Lopez
(74) Attorney, Agent, or Firm—Nixon & Vanderhye P.C.

(57) ABSTRACT

Provided are a method for producing a glass suitable for an information recording medium required to have high qualities, a process for the production of a glass substrate blank from the above glass and a process for the production of a glass substrate from the above blank. The method is for the production of a glass containing an alkali metal element by melting a glass material in a glass melting apparatus and uses, as said melting apparatus, a melting apparatus whose glass-contact portion is made of a material containing zirconium and containing substantially no alkali metal element. In the process for the production of a glass substrate blank, the glass obtained by the above method is press-molded or is subjected to a float process, and in the process for the production of a glass substrate, the above glass substrate blank is lapped and polished.

8 Claims, 1 Drawing Sheet

METHODS FOR THE PRODUCTION OF GLASS SUBSTRATE BLANK

BACKGROUND OF THE INVENTION

1. Field of the Invention

The present invention relates to a method for the production of a glass suitable for an information recording medium that is required to have high qualities, a process for the production of a glass substrate blank and a glass substrate from the glass obtained by the above production method, an information recording medium to which the above glass substrate is applied, and a glass melting apparatus for use in the above glass production method.

2. Prior Art of the Invention

Generally, as a material for a glass-contact-portion of a glass melting apparatus (to be sometimes referred to as "furnace material" hereinafter), an AZS ($Al_2O_3$—$ZrO_2$—$SiO_2$-containing) electrocast refractory material is used for a high-temperature portion and an alumina-containing electrocast refractory material is used for a relatively low-temperature portion. These furnace materials are desired for reasons that they cause less contamination to a glass and causes foaming to a less degree. For example, these materials are used in a glass-contact-portion of a melting apparatus for soda lime glass, a glass for CRT, an optical glass and a glass for electronic devices. For the same reason, it is considered desirable to use an AZS electrocast refractory material as a furnace material in a glass-contact portion for a glass as a material for a substrate of an information recording medium such as a glass substrate for a magnetic disk.

Meanwhile, it has been mainstream practice to use an aluminum substrate as a substrate for a conventional magnetic disk. With increasing demands for a higher density of a magnetic disk, the substrate material for the magnetic disk is shifting from an aluminum material to a glass material since the glass material has a high Young's modulus and can easily accomplish the flatness of a disk surface. Further, with an increase in the density of a magnetic disk, the distance between a recording medium and a write/read head decreases markedly. These days, the above distance is as close as a distance of approximately a few molecules arranged side by side. In operation of a magnetic disk, it is required to turn the disk several thousand times a second while maintaining the above fine distance as a distance between the head and the disk. The above state is something like a state in which a large jetliner flies tens centimeters above a ground without colliding with any obstacle, and the fact is that the surface of a substrate for an information recording medium is required to be free of any fine projection.

One of the substrate surface defects that hamper the above higher-density recording is a $ZrO_2$ mound problem. It is assumed that the $ZrO_2$ mound is caused as follows. $ZrO_2$ has a higher hardness than glass. When the surface of a glass substrate containing $ZrO_2$ particles is polished, the $ZrO_2$ particles present in the surface decrease slowly and the glass decreases rapidly. As a result, $ZrO_2$ particles present in the surface come to appear as fine projections on the substrate surface. These fine projections are zirconia mounds, and when the projections are present, forms of such projections are reflected on the surface of a recording medium and the projections cause a head crash that is a collision of a head with the surface of the magnetic disk. In high-density recording media provided these days, even the presence of only one fine $ZrO_2$ mound causes the recording media to be defective. When a glass as a material for a substrate for an information recording medium is melted, therefore, it is required to perfectly prevent the inclusion of $ZrO_2$ particles.

There are large glass demands in the above field, and under the circumstances, such demands can be fulfilled only when glass is mass-produced. There is therefore required a technique for stably producing a large amount of a glass containing no $ZrO_2$ particles.

When a glass as a material for a substrate of the above information recording medium is melted in a glass melting apparatus made of an AZS electrocast refractory material, the $ZrO_2$ mound problem is liable to be caused. It has been considered that the above problem is caused as follows. When the $ZrO_2$ content in a glass is large, for example, 5% by weight or more, $ZrO_2$ cannot be melted well, so that a non-melted substance of $ZrO_2$ is liable to be generated. Therefore, attention has been paid only to the content of $ZrO_2$, and no attention has been paid to the relationship between a melting apparatus and the generation of a $ZrO_2$ crystal. Under the circumstances, it has been impossible to obtain a large amount of glass substrates that contain no $ZrO_2$ crystal grains and are free of $ZrO_2$ mounds.

SUMMARY OF THE INVENTION

It is an object of the present invention to provide a method for the production of a glass that is free of a surface fine projection problem caused by high melting substances ($ZrO_2$, $SiO_2$, $Al_2O_3$, etc.) such as $ZrO_2$ mounds and which can be suitably used as a substrate for an information recording medium.

It is another object of the present invention to provide a process for efficiently producing a glass substrate blank and a high-quality glass substrate from the glass obtained by the above method, an information recording medium to which the above glass substrate is applied, and a glass melting apparatus for use in the method for the production of a glass free of the above problem of $ZrO_2$ mounds, and the like.

For achieving the above objects, the present inventors have made diligent studies and as a result have found the following.

It has been found that it is neither because a $ZrO_2$ material as a glass component is sparingly soluble nor because a glass composition contains 5% by weight or more of a $ZrO_2$ component.

The mechanism of generation of $ZrO_2$ mounds is possibly based on a reaction between Li element in glass components and Na element in a glass phase which is present in an AZS electrocast refractory material constituting a portion of contacting a high-temperature glass in a melting apparatus. In the AZS electrocast refractory material, approximately 1 to 10%, based on the weight of the refractory material, of $Na_2O$ is present as a component in a glass phase. Therefore, Na ion from $Na_2O$ contained in the glass phase of the AZS electrocast refractory material and Li ion from $Li_2O$ as a glass component undergo an ion-exchange, and Na in the glass phase is substituted for Li, to cause softening and to destroy the AZS crystal structure. As a result, the AZS refractory material gets out of shape to form fragments and such fragments are included in a molten glass in contact with the AZS refractory material. $ZrO_2$ constituting the glass phase of the refractory material is included in the glass, so that a number of $ZrO_2$ crystal grains having a high melting point come to be present in the molten glass.

On the other hand, a zirconia refractory material (having a $ZrO_2$ purity of at least 90%) contains almost no or little Na component, so that the contact surface of the refractory material to a glass continues to be smooth and retains an original shape. As a result, a glass obtained by melting it in such a refractory material shows no defects such as devitrification and impurities.

On the basis of the above facts, when a glass containing Li element is melted, the $Na_2O$ impurity concentration in an electrocast refractory material to be used is required to be 1% by weight or less, desirably, 0.5% by weight or less.

As is clear from the above experimental results, a combination of a glass containing Li element and a melting apparatus formed of an electrocast refractory material in which a glass phase contains Na element causes the generation of $ZrO_2$ crystal grains in a glass material.

The present inventors have therefore arrived at a conclusion that the use of an alkali-free electrocast refractory material as a material for a apparatus for melting a glass containing Li element is essential for the production of a glass material such as a material for a magnetic disk substrate that is required to have a surface flatness.

The present invention has been completed on the basis of the above finding.

That is, the present invention provides;

(1) a method for the production of a glass containing an alkali metal element by melting a glass material in a glass melting apparatus, the method using, as said melting apparatus, a melting apparatus whose glass-contact portion is made of a material containing zirconium and containing substantially no alkali metal element, (2) a method according to the above (1), wherein the glass containing an alkali metal element is a glass containing lithium element, (3) a method according to the above (1), wherein the material forming the glass-contact portion of the glass melting apparatus is a material containing substantially no sodium element, (4) a method according to the above (1), wherein the glass containing an alkali metal element is a glass containing at least one oxide selected from $SiO_2$, $Al_2O_3$ and $ZrO_2$, (5) a method according to the above (1), wherein the glass is a glass to be chemically strengthened and/or to be crystallized, (6) a process for the production of a glass substrate blank, which comprises press-molding the glass obtained by the method recited in the above (1) in a molten state, or subjecting said glass in molten state to a float process, (7) a process for the production of a glass substrate, which comprises lapping and polishing the glass substrate blank produced by the process recited in the above (6), (8) a process for the production of a glass substrate according to the above (7), wherein the glass substrate is chemically strengthened after the lapping and polishing, (9) a process for the production of a glass substrate according to the above (7), wherein the glass is crystallized before the glass is finally polished,

(10) a process for the production of a glass substrate according to the above (7), wherein the glass substrate is a substrate for an information recording medium,

(11) an information recording medium comprising the glass substrate produced by the process recited in the above (10) and an information recording layer formed on a main surface of the glass substrate, and

(12) a glass melting apparatus for melting a glass material to produce a glass containing an alkali metal, wherein a material of a portion that comes in contact with a glass when the glass material is melted is formed of a material containing zirconium and containing substantially no alkali metal element.

PREFERRED EMBODIMENT OF THE INVENTION

Figure 1:
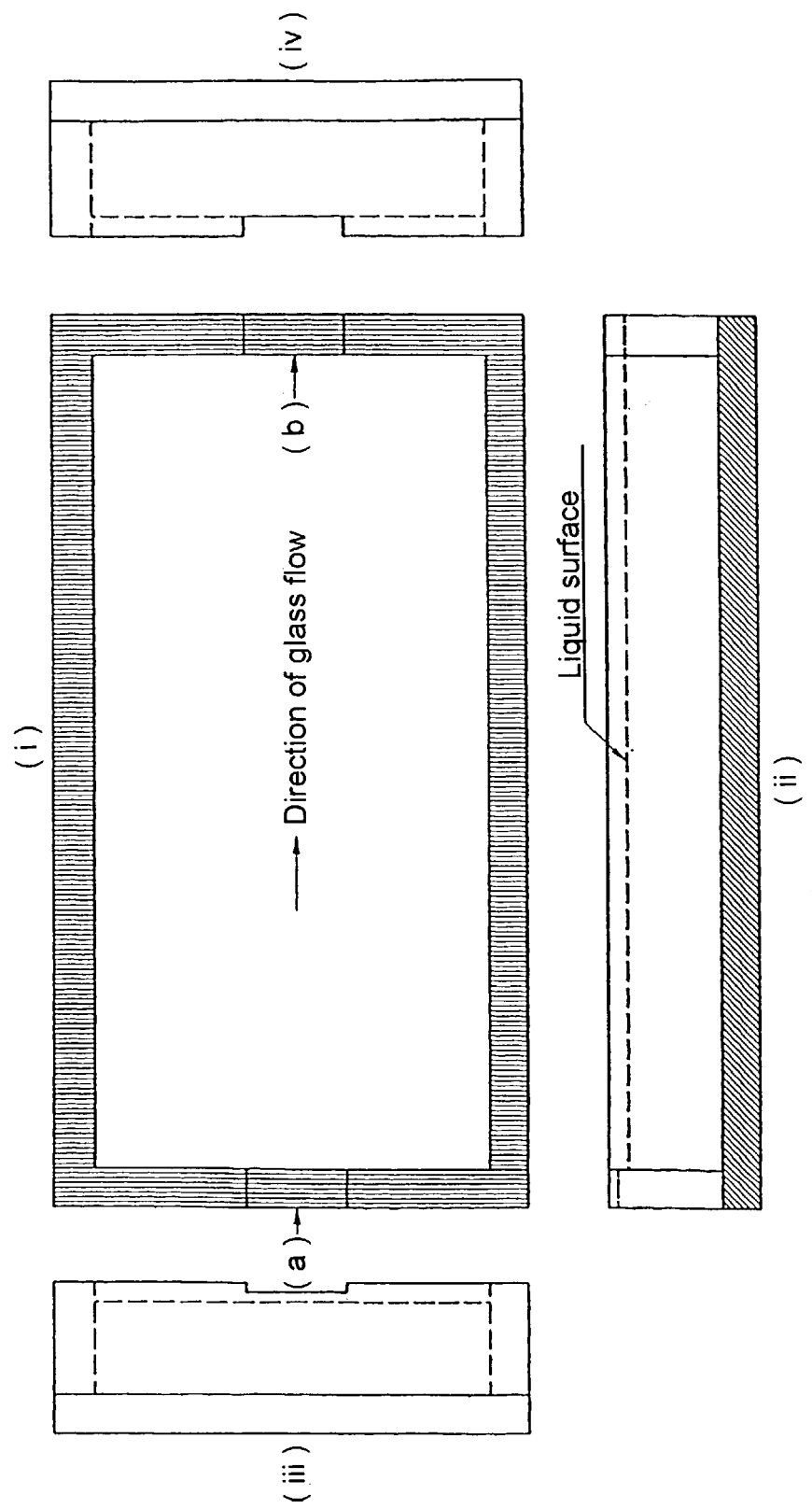
FIG. 1 shows a plan view, a front view and side views of a glass melting vessel in Example 1.

The method for the production of a glass, provided by the present invention, will be explained first.

In this method, when a glass material is melted in a glass melting apparatus to produce a glass containing an alkali metal element, there is used a melting apparatus whose glass contact portion is made of a material containing zirconium and containing substantially no alkali metal element.

In the glass substrate such as a glass substrate for an information recording medium, generally, the glass substrate is chemically strengthened for improving the glass substrate in strength. As a glass for the above chemical strengthening, a glass containing an alkali metal element, particularly, lithium element, as a glass component, is used.

The inclusion of crystal grains in a molten glass takes place since the furnace material is corroded by the above ion-exchange between an alkali component in the glass and an alkali component contained in the glass phase of furnace material of the glass contact portion of a melting apparatus. That is, $Li_2O$ in the glass is a component that undergoes ion-exchange with sodium ion of the glass phase of the furnace material during melting, so that it is required to use an alkali-free material as a furnace material. The object of the present invention can be accomplished by using a furnace material containing no alkali metal component for the entire portion with which a glass comes in contact during melting of the glass (to be referred to as "glass-contact portion" hereinafter). In a particularly preferred embodiment, the entire glass contact portion is formed of a furnace material made of a $ZrO_2$ electrocast refractory material except for a heating electrode.

As a material for a substrate for an information recording medium, a crystallized glass has excellent properties as well. For the field of a substrate for an information recording medium where a smooth main surface is demanded, crystallization is carried out while strictly controlling the size and density of a crystal phase. For precipitating a crystal phase containing, as a component, an alkali metal such as lithium, a glass (matrix glass) that is a starting glass for a crystal glass naturally contains an alkali metal. When the above glass is melted, there is also caused a problem that the molten glass is contaminated by the corrosion of a furnace material. When crystal grains from the above contamination are included in the matrix glass, the crystal grains appear as abnormal projections on a substrate surface even if the above controlling is performed in the crystallization step, and the smoothness and flatness of a substrate surface are impaired. For melting a matrix glass for a crystallized glass containing an alkali metal, the method of the present invention is effective as well.

The above furnace material containing substantially no alkali metal component refers to a furnace material containing an alkali metal component in such an amount that the furnace material is not corroded by ion-exchange with an alkali metal ion in a molten glass and a furnace material containing no alkali metal component. In the former case, the tolerable content of an alkali metal component differs depending upon conditions such as a melting temperature, a glass composition and a glass material. Generally, the corrosion of the furnace material can be prevented so long the content of the alkali metal component is 1% by weight or less.

The above content is preferably 0.5% by weight. A furnace material containing no sodium element is particularly preferred.

The above furnace material includes a refractory material containing monoclinic zirconia and a glass phase combining monoclinic zirconia, and an electrically cast refractory material containing zirconia as a main component (component whose content is the largest) and further containing $SiO_2$. The electrocast refractory material can be obtained by completely melting a refractory raw material, casting a melt into a mold, molding a cast melt and cooling a resultant product to solidness.

The method for the production of a glass, provided by the present invention, is suitable for producing a glass containing an alkali metal element, particularly, a glass containing at least one oxide selected from $SiO_2$, $Al_2O_3$ and $ZrO_2$ and containing an alkali metal element. When the above alkali metal component is a component containing lithium element such as $Li_2O$, a particularly remarkable effect can be produced as compared with any other conventional method. When the content of $ZrO_2$, $Al_2O_3$ and $SiO_2$ in a glass is originally small, it is assumed that $ZnO_2$, $Al_2O_3$ and $SiO_2$ from the furnace material is possibly dissolved in the glass, and crystal grains due to these substances from the furnace material are not generated. In a glass containing large amounts of such components, the dissolving reaction of the above substances from the furnace material does not easily proceed, and as a result, fine crystal grains are generated.

Therefore, the present invention is suitable for producing an aluminosilicate glass, and particularly suitable for producing an aluminosilicate glass containing $ZrO_2$.

Specifically, the above glass includes glasses containing 50 to 70 mol % of $SiO_2$, 0 to 20 mol % of $Al_2O_3$ and 0 to 15 mol % of $ZrO_2$ and having an alkali metal oxide total content of 0.5 to 25 mol %. Of these, a glass containing $Li_2O$ as an alkali metal oxide is more preferred, and a glass containing 0.5 to 20 mol % of $Li_2O$ is still more preferred. Further, a glass containing 10 mol % or less of CaO or MgO which is a divalent component, as an RO component, or a glass containing no such component as a glass component is desirable.

$SiO_2$ is a main component for forming a glass network. When the content thereof is less than 50 mol %, the liquidus temperature of a glass is low and the viscosity thereof is also low, so that it is difficult to mold the glass. When the content of $SiO_2$ exceeds 70 mol %, the viscosity of a glass is extremely high, so that it is difficult to melt the glass. The content of $SiO_2$ is therefore preferably in the above range.

$Al_2O_3$ is incorporated for improving a glass in the capability of ion-exchange in a glass surface. When the content thereof exceeds 20 mol %, there may be caused a drawback that a non-melt is generated due to deterioration of meltability. The content of $Al_2O_3$ is therefore preferably in the above range.

$ZrO_2$ is a component that is not easily dissolved in a glass and is liable to form fine crystal grains. However, it is a component that improves a glass in chemical durability, strength and hardness as a substrate and ion-exchange efficiency. However, when the content thereof exceeds 15 mol %, it is difficult to melt the glass. Therefore, the content of $ZrO_2$ is preferably in the above range.

Alkali metal oxides are components that chemically strengthen a glass when they undergo ion-exchange in a glass surface portion with alkali metal ion in an ion-exchange bath. When the total content thereof is less than 0.5 mol %, it is not sufficient for strengthening of a glass by chemical strengthening. When it exceeds 25 mol %, the chemical durability of a glass may sometimes decrease. Therefore, the total content of the alkali metal oxides is preferably in the above range.

Of the alkali metal oxides, $Li_2O$ is a component that undergoes ion-exchange in a glass surface portion mainly with Na ion in an ion-exchange bath to chemically strengthen a glass. When the content thereof is less than 0.5 mol %, the Young's modulus of the glass is low. When it exceeds 20 mol %, the chemical durability may be caused to decrease. Therefore, the content of $Li_2O$ is preferably in the above range.

Examples of preferred glass compositions will be further given below.

A glass containing, by % by weight, 60 to 75% of $SiO_2$, 5 to 18% of $Al_2O_3$, 4 to 10% of $Li_2O$, 4 to 15% of $Na_2O$ and 3 to 15% of $ZrO_2$ and, particularly, having a $Na_2O/ZrO_2$ weight ratio of from 0.5 to 2.0 and an $Al_2O_3/ZrO_2$ weight ratio of from 0.4 to 2.5 (Glass 1).

A glass containing, by mol %, 35 to 65% of $SiO_2$, 0.1 to less than 15% of $Al_2O_3$, 4 to 20% of $Li_2O$, 0 to 8% of $Na_2O$, the total content of $Na_2O$ and $Li_2O$ being 3 to 30%, 0.1 to 30% of $TiO_2$ and 1 to 45% of CaO, the total content of MgO and the above CaO being 5 to 40% (Glass 2).

A glass containing, by mol %, 50 to 70% of $SiO_2$, 1 to 30% of $Al_2O_3$, 1 to 20% of $Li_2O$, the alkali metal total content ($Li_2O+Na_2O+K_2O$) being 1 to 25%, 0 to 10% of CaO+MgO as a total, 0 to 5% of $ZrO_2$ and 0 to 4% of $TiO_2$ (Glass 3).

The glasses 1 and 2 are suitable for chemical strengthening, and the glass 3 is suitable as a matrix glass for a crystallized glass.

In the melting of the above glass, predetermined amount of oxides, carbonates, nitrates, hydroxides, etc., are weighed and mixed to obtain a formulated material, the formulated material is poured into a melting apparatus heated at a temperature of from 1,150 to 1,600° C., preferably 1,200 to 1,500° C., melted, and a melt is clarified and stirred to homogenize it, whereby a molten glass is obtained. The molten glass is shaped in a desired form, to give a glass in which the total amount of $SiO_2$, $Al_2O_3$ and $ZrO_2$ is contained in a molten state, that is, the above components are all contained in an amorphous state.

When a glass containing zirconium is melted, desirably, a glass material containing zirconium is milled to a power state and supplied to a melting apparatus, since the glass material containing zirconium (e.g., $ZrO_2$) has relatively poor solubility. For improving the glass material in solubility, the above glass material preferably has a smaller particle diameter on one hand. On the other hand, when the particle diameter of the glass material is too small, part of the glass material is liable to fly off during preparation of the glass material or when the glass material is supplied to a melting apparatus. When part of the glass material flies off, the formulation ratio of the glass material formulated to obtain a desired glass composition changes, and, undesirably, there is caused a deviation from the glass composition for an end product. The particle diameter of the glass material is therefore adjusted to a range that is determined by taking account of the solubility of the glass material and easiness in handling of the glass material. When the glass material contains zirconium, the particle diameter of the glass material is preferably in the range of from 5 to 50 μm for the above reason.

The melting apparatus used for melting the above glass has been already explained.

It can be confirmed visually, through a microscope or by irregular reflection of monochromatic light whether nor not the total amount of $SiO_2$, $Al_2O_3$ and $ZrO_2$ is contained in a molten state.

The processes for the production of a glass substrate and a glass substrate, provided by the present invention, will be explained below.

In the process for the production of glass substrate blank in the present invention, a glass in a molten state produced by the above method is press-molded or is subjected to a float process to produce a glass substrate blank. When a high-quality glass substrate for an information recording medium is produced at high yields, it is desirable to press-mold a molten glass produced by the above method in a state where the molten glass has a temperature at which it can be press-molded, to produce a glass substrate blank having a form similar to a glass substrate. After annealed, the thus-prepared blank is lapped and polished to the form of a substrate, to produce a glass substrate having a flatness and a smoothness to a remarkably high degree. For improving the glass substrate in strength as required, further, the substrate may be chemically strengthened or heat-treated for crystallization.

In the production of the glass substrate blank, a predetermined amount of a molten glass obtained by melting and homogenization according to the above method is supplied onto a molding surface, preferably onto a molding surface of a lower mold member under heat at a predetermined temperature, through a flow pipe. The molding surface has a powdery mold release agent applied thereto. Before the temperature of the glass comes to be lower than a press-moldable temperature range, the glass is press-molded in the form of a glass substrate blank with an upper mold member and the lower mold member or with the above upper and lower mold members and a sleeve. Then, when the molded product has a temperature around its glass transition temperature, the molded product is taken out of the mold. The molded product is quenched to a temperature around the distortion point of the glass, and then annealed in an annealing furnace, to give a glass substrate blank. In the course after the press-molding and before the molded product is taken out, the molded product may be pressed for correcting its warpage. In the supply of the molten glass onto the lower mold member, it is essential to adjust the glass temperature to a temperature range in which the glass can continuously flow out of the flow pipe and does not devitrify. The thus-obtained glass substrate blank has the same composition as that of the above molten glass and contains no $ZrO_2$ crystal grains or contains none of $SiO_2$ and $Al_2O_3$ crystal grains. While the process for the production of a substrate blank has been explained with reference to a press-molding method as an example hereinabove, the substrate blank may be formed by a float process, or other known molding method such as a down draw molding method may be employed. In any molding method, it is desirable to prevent crystallization caused by the devitrification of a glass during the molding and the treatment after the molding.

The thus-obtained glass substrate blank is lapped and polished to complete a glass substrate. The lapping and polishing can be carried out according to known methods. The glass substrate blank of the present invention contains no crystalline structure of $ZrO_2$ or $ZrSiO_4$. The above crystalline structure has a higher hardness than a glass having an amorphous state. If the substrate blank contains the above crystalline structure, the polishing rate to the amorphous structure is much higher than the polishing rate to the crystalline structure due to a difference in hardness when the main surface of the substrate is formed by lapping and polishing, so that projections of the crystalline structure are liable to be formed on the substrate surface. Since, however, the substrate blank of the present invention does not contain the above crystalline structure, the glass substrate obtained has no such projections formed on its surface and is suitable as a substrate for an information recording medium having a high recording density.

The chemical strengthening treatment will be explained below. The lapped and polished substrate is immersed in a molten salt containing alkali metal ion, and in this treatment, alkali metal ion in the glass substrate and alkali metal ion in the molten salt undergo ion-exchange. In this case, the alkali metal ion to be contained in the molten salt is selected from alkali metal ion having a larger ionic radius than the alkali metal ion of the glass that is to undergo the ion-exchange. For example, when the glass substrate contains lithium ion, the molten salt preferably contains sodium ion and/or potassium ion. When the glass substrate contains sodium ion, the molten salt preferably contains potassium ion. Since the glass substrate of the present invention contains lithium ion and sodium ion, it is preferred to use a molten salt containing sodium ion and potassium ion. As a molten salt, it is preferred to use a nitrate of an alkali metal, while a sulfate, hydrogen sulfate, carbonate, halide, or the like may be used. For improving the chemical strengthening efficiency, the glass for constituting a substrate preferably contains $ZrO_2$. When the glass contains $ZrO_2$, it is liable that $ZrO_2$ from a furnace material remains as a crystal phase in the glass during the melting of the glass. In the present invention, however, no $ZrO_2$ from a furnace material is included even if a glass contains $ZrO_2$ as a glass component, so that there can be obtained a glass substrate containing no $ZrO_2$ crystalline structure and that chemically strengthened glass substrates can be produced at high yields. The chemically strengthened glass can be subjected to alkali elution treatment as required.

In the present invention, the glass may be crystallized to form a crystallized glass before final polishing treatment, and the crystallized glass may be polished to produce a glass substrate.

The thus-obtained glass substrate has a remarkably flat and smooth main surface, and has no projections made of $SiO_2$, $Al_2O_3$ and $ZrO_2$ crystal structures on the main surface. The glass substrate is therefore suitable as a substrate for an information recording medium.

When the above substrate is used as a substrate for a magnetic recording medium, the magnetic recording medium surface and a write/read head do not come in contact, or collide, with each other even if the magnetic recording medium surface and the above head are brought close to each other for complying with a high recording density, and the head can retain a stable flying height. There can be therefore provided a highly reliable information recording medium. An information recording medium can be obtained from the above substrate by a known method in which an information recording layer (e.g., a magnetic layer when the information recording medium is a magnetic recording medium) is formed and, optionally, is coated with a protective layer for protecting the recording layer to form a multi-layer. The main surface of the above glass substrate for an information recording medium has a flatness of 20 nm or less as a surface roughness (Ra).

When a substrate that is made of aluminosilicate glass containing $ZrO_2$ and is chemically strengthened is used as the above substrate, the substrate has excellent weather resistance and excellent mechanical strength and has high reliability. Further, the substrate has high stability against the high-speed rotation of a disk-shaped information recording medium.

According to the present invention, there is also provided a glass melting apparatus for melting a glass material to produce a glass containing an alkali metal, wherein a material of a portion that comes in contact with a glass when the glass material is melted is formed of a material containing zirconium and containing substantially no alkali metal element.

EXAMPLES

The present invention will be explained more in detail with reference to Examples hereinafter, while the present invention shall not be limited by these Examples.

Example

A glass melting vessel used in this Example is a vessel made of an electrocast refractory material in which a glass material is poured and heated to obtain a molten glass.

FIG. 1 shows a plan view (i), a front view (ii) and side views [left side view (iii) and right side view (iv)] of the glass melting vessel in the Example. The melting vessel shown in FIG. 1 has a glass material melting portion on a front side (left hand side), into which a glass material is introduced. The melting vessel has four side surfaces and one bottom surface, and has a material inlet port (a) on a front side (left hand side) and a molten glass outlet port (b) on a vessel backward side (right hand side). The entire portion that comes in contact with a molten glass is formed of an electrocast refractory material containing no alkali metal.

Above the melting vessel, there are provided a bricked roof (not shown), a heating combustion burner (not shown) and a gas discharge port. As shown in FIG. 1, a glass material is intermittently or continuously charged into the melting vessel through a portion (a) on the front side of the melting vessel. The heating can be carried out by a method in which a mixture of a combustible gas (butane, propane, or the like) with a combustion aid gas (air, oxygen, or the like) is combusted above a glass liquid surface with a burner to melt the glass material, or a method in which an electrode ($SnO_2$, $MoO_2$, or the like) for applying electricity is brought directly into contact with a molten glass to heat the molten glass, or a combination of these methods. The glass melted by the above heating method flows from (a) to (b) while it comes in contact with a refractory material containing no alkali metal. The portion (b) is an outlet of the glass, and overflowed glass successively flows, for example, to a clarification vessel and a working vessel in which a molten glass is homogenized by stirring, and the like. In the clarification vessel, a portion with which the molten glass comes in contact can be made of a refractory material containing no alkali metal like the melting vessel, or made of platinum or a platinum alloy. The working vessel can be constituted of platinum or a platinum alloy. In the above melting vessel, the molten glass may be clarified as well.

In the melting vessel shown in FIG. 1, generally, the level of a glass liquid surface is approximately 60 to 80% of the height of the sidewall, while the level may be lower than such a percentage.

While this Example uses a refractory material containing no alkali metal for forming the portion that comes in contact with a molten glass, there may be also used a commercially available refractory material of which the alkali metal content is limited to a very low level (1% by weight or less, preferably 0.5% by weight or less). The above refractory material includes, for example, an electrocast refractory material in which 94% by weight of monoclinic zirconia is dispersed in 6% by weight of a glass phase. The content of $Na_2O$ in the refractory material is limited to 0.3% by weight or less, and some refractory materials contain small amounts of $SiO_2$, $Al_2O_3$ and $TiO_2$ in addition to main components.

A glass material that was to give a molten glass 1 containing $SiO_2$, $Al_2O_3$, $Li_2O$, $Na_2O$ and $ZrO_2$ was melted in the above melting apparatus. A glass material that was to give a glass 2 containing $SiO_2$, $Al_2O_3$, $Li_2O$, $Na_2O$, $TiO_2$, CaO and MgO was melted in the above melting apparatus. A glass material that was to give a glass 3 containing $SiO_2$, $Al_2O_3$, $Li_2O$, $Na_2O$, $K_2O$, CaO, MgO, $ZrO_2$ and $TiO_2$ was melted in the above melting apparatus.

After the above glass materials were melted, no corrosion was found on the refractory material which had been in contact with molten glasses for a long period of time, and it was sufficient to perform maintenance of the melting vessel at an ordinary level.

Information recording media were produced from the molten glasses 1 to 3 by the following two molding methods (first and second molding methods).

The first molding method is as follows. A clarified and homogenized molten glass was allowed to flow through a flow pipe made of a platinum alloy at a constant speed, and the glass that was flowing out was received on a mold (lower mold member) consecutively. Each received glass was molded into a thin-plate disk-shaped glass with the above lower mold member and an upper mold member that faced the lower mold member. The thin-plate glass was transported into an annealing furnace and annealed. Such thin-plate disk-shaped glasses formed from the molten glasses 1 and 2 were subjected to outer diameter and inner diameter processing and surface lapping and polishing, and then immersed in a molten salt of sodium nitrate and potassium nitrate for chemical strengthening, whereby disk-shaped glass substrates for an information recording medium were formed.

Thin-plate glass formed from the molten glass 3 was subjected to a series of steps including outer diameter and inner diameter processing, surface lapping and polishing and crystallization by heat treatment, to give a crystallized glass substrate for an information recording medium.

None of the above thin-plate glasses and the above substrates had surface fine projections caused by contamination during the melting, and they satisfied requirements of a substrate for an information recording medium.

In the second molding method, each of clarified and homogenized molten glasses 1 to 3 was subjected to a float process to form thin-plate glasses. Each thin-plate glass obtained by the float-process was annealed and then shaped into a disk. Thereafter, such disks were treated in the same manner as in the first molding method, to give disk-shaped substrates for an information recording medium. None of the above thin-plate glasses and the above substrates had surface fine projections caused by contamination during the melting, and they satisfied requirements of a substrate for an information recording medium.

A multi-layer film including a magnetic recording layer was formed on each of the above substrates, to give information recording media.

Since the portion of the melting vessel that comes in contact with a molten glass is formed of the furnace material containing substantially no alkali metal as described above, the molten glass contamination caused by inclusion of furnace materials can be prevented even if the molten glass contains an alkali component, and there can be efficiently produced, at high yields, an alkali component-containing glass containing no crystalline structure of a high melting substance, a chemically strengthened glass formed of the above glass, and a substrate formed of a crystallized glass obtained by heat treatment of the above glass.

By using the above substrate, information recording media such as a magnetic disk can be stably produced efficiently at high yields.

Comparative Example

Each of the above glass materials used in the Example was melted in a melting vessel made of a refractory material containing $ZrO_2$ and $Al_2O_3$ as main component and containing other components such as $SiO_2$, $Na_2O$ and the like. The above refractory material had an $Na_2O$ content of 1.5% by weight. When the melting was continuously carried out, a portion that came in contact with molten glass was corroded. Each of the glasses melted as above was clarified, stirred and supplied onto a mold through a flow pipe. A received glass was press-molded to form a substrate blank for an information recording medium. The thus-obtained blanks were annealed to remove their distortion, and the surface of each blank was lapped and polished to form substrates. When the substrate surfaces were observed, fine projections were found. The projections were analyzed to show that they were formed of zirconia. These projections were to cause head clash, so that the substrates were not usable as substrates for any magnetic disk.

EFFECT OF THE INVENTION

According to the method for the production of a glass, provided by the present invention, a glass containing an alkali metal element can be efficiently produced at high yields in a dissolved state in which no crystalline structure of a high melting substance such as $ZrO_2$ or $ZrSiO_4$ is present.

According to the present invention, there can be provided a melting apparatus for efficiently producing a glass containing an alkali metal element at high yields, a glass substrate blank containing no crystalline structure made of a refractory substance, and a flat glass substrate having no surface projections made of fine crystalline structures.

Furthermore, according to the present invention, there can be provided an information recording medium having a flat glass substrate having no surface projections made of fine crystalline structures, and there can be produced a highly reliable information recording medium that can attain a high recording density.

What is claimed is:

1. A process for the production of a magnetic recording medium, which comprises the steps of:
   (a) selecting a glass melting apparatus whose glass-contact portion is made of an electrocast zirconia refractory material having a $ZrO_2$ purity of at least 90% by weight percent and is substantially free of sodium element,
   (b) melting a glass material containing lithium element in the glass melting apparatus selected in step (a) to obtain a glass containing an alkali metal element thereby avoiding the generation of $ZrO_2$ crystal grains in the glass material therein, and
   (c) lapping and polishing the glass produced in the step to obtain the glass substrate having no or substantially free of $ZrO_2$ mounds thereon and forming a magnetic layer on the lapped and polished glass substrate to obtain the magnetic recording medium.

2. The process according to claim 1, wherein the glass substrate is chemically strengthened after the lapping and polishing.

3. The process according to claim 1, wherein the glass obtained containing an alkali metal element is crystallized before the glass is finally polished.

4. The process according to claim 1, wherein the glass containing an alkali metal element is a glass containing at least one oxide selected from $SiO_2$, $Al_2O_3$ and $ZrO_2$.

5. The process according to claim 1, wherein the glass obtained containing an alkali metal element is a glass to be chemically strengthened and/or to be crystallized.

6. The process according to claim 1, wherein the material constituting a glass-contact portion of the glass melting apparatus contains 1% by weight or less of $Na_2O$ impurity.

7. The process according to claim 6, wherein the material constituting a glass contact portion of the glass melting apparatus contains 0.5% by weight or less of $Na_2O$ impurity.

8. The process according to claim 7, wherein the material constituting a glass contact portion of the glass melting apparatus contains 0.3% by weight or less of $Na_2O$ impurity.

* * * * *